(12) United States Patent
Kase

(10) Patent No.: US 9,488,900 B2
(45) Date of Patent: Nov. 8, 2016

(54) PROJECTION APPARATUS INCLUDING LIGHT SOURCES AND HEAT RADIATING MEMBERS

(71) Applicant: CASIO COMPUTER CO., LTD., Shibuya-ku, Tokyo (JP)

(72) Inventor: Toshifume Kase, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 54 days.

(21) Appl. No.: 14/540,772

(22) Filed: Nov. 13, 2014

(65) Prior Publication Data

US 2015/0160541 A1  Jun. 11, 2015

(30) Foreign Application Priority Data

Dec. 9, 2013 (JP) .................................. 2013-254144

(51) Int. Cl.
*G03B 21/16* (2006.01)
*H04N 9/31* (2006.01)
*G03B 21/20* (2006.01)

(52) U.S. Cl.
CPC ........... *G03B 21/16* (2013.01); *G03B 21/2013* (2013.01); *H04N 9/3144* (2013.01)

(58) Field of Classification Search
CPC .... G03B 21/16; G03B 21/145; G03B 21/14; H04N 9/3144; H04N 9/3164; F21V 29/02
USPC ........................... 353/57, 58, 60, 61; 362/373
See application file for complete search history.

(56) References Cited

U.S. PATENT DOCUMENTS

| 2011/0157560 A1* | 6/2011 | Hsiao | H04N 9/3144 353/58 |
| 2014/0085612 A1* | 3/2014 | Wu | G03B 21/16 353/57 |
| 2014/0092368 A1* | 4/2014 | Dai | G03B 21/16 353/58 |

FOREIGN PATENT DOCUMENTS

JP           2008181776 A       8/2008

* cited by examiner

*Primary Examiner* — William C Dowling
*Assistant Examiner* — Ryan Howard
(74) *Attorney, Agent, or Firm* — Holtz, Holtz & Volek PC

(57) ABSTRACT

A projection apparatus includes: a housing which includes an intake vent formed in one side surface, and an exhaust vent formed in the other side surface; a first light source; a first heat radiating member which includes fins; a heat transfer pipe which connects the first light source and the first heat radiating member; a second light source; a second heat radiating member which includes fins; and a heat transfer pipe which connects the second light source and the second heat radiating member, wherein the first light source, first heat radiating member, first heat transfer pipe, second light source, second heat radiating member and second heat transfer pipe are housed in the housing, and the first heat radiating member and the second heat radiating member are disposed on a gas flow path substantially linearly connecting the intake vent and the exhaust vent.

13 Claims, 3 Drawing Sheets

PROJECTION APPARATUS INCLUDING LIGHT SOURCES AND HEAT RADIATING MEMBERS

CROSS-REFERENCE TO RELATED APPLICATIONS

This application is based upon and claims the benefit of priority from the prior Japanese Patent Application No. 2013-254144 filed on Dec. 9, 2013, the entire contents of which are incorporated herein by reference.

BACKGROUND OF THE INVENTION

1. Field of the Invention

The present invention relates to a projection apparatus including light sources and heat radiating members.

2. Description of the Related Art

As described in Japanese Patent Application Laid-Open Publication No. 2008-181776 for example, a projection apparatus such as a projector apparatus is equipped with a plurality of light sources, and heat radiating members such as heat sinks are provided correspondingly to the light sources, respectively. Each of the heat radiating members is directly cooled by a dedicated fan, or connected to one (1) fan through a duct and cooled by the one fun.

However, in both of the cases that the dedicated fan is provided correspondingly to each of the heat radiating members and that each of the heat radiating members is connected to the one fan via the duct, it is actually necessary to secure setting spaces for them, and thereby the size of the entire apparatus becomes large.

In view of these problems, an object of the present invention is to make the heat radiating structure for the light sources become compact so that the whole size of the projection apparatus is reduced.

According to the present invention, the heat radiating structure for the light sources can be compact, and the whole size of the projection apparatus can be reduced.

SUMMARY OF THE INVENTION

According to the first aspect of the present invention, there is provided a projection apparatus including: a housing which includes an intake vent formed in one side surface of the housing, and an exhaust vent formed in the other side surface of the housing; a first light source; a first heat radiating member which includes a plurality of fins; a heat transfer pipe which connects the first light source and the first heat radiating member; a second light source; a second heat radiating member which includes a plurality of fins; and a heat transfer pipe which connects the second light source and the second heat radiating member, wherein the first light source, the first heat radiating member, the first heat transfer pipe, the second light source, the second heat radiating member, and the second heat transfer pipe are housed in the housing, and the first heat radiating member and the second heat radiating member are disposed on a gas flow path substantially linearly connecting the intake vent and the exhaust vent.

BRIEF DESCRIPTION OF THE SEVERAL VIEWS OF THE DRAWINGS

The above and further objects, features and advantages of the present invention will be made clearer by the following detailed description and the attached drawings, in which.

DETAILED DESCRIPTION OF THE PREFERRED EMBODIMENTS

Hereinafter a best mode for implementing the present invention will be described with reference to the drawings. In this regard, however, the scope of the invention is not limited to the following embodiments or illustrated examples.

The specific illustrative embodiments will be hereinafter described with reference to the drawings. In this regard, however, the scope of the invention is not limited to the illustrated examples.

Figure 1:
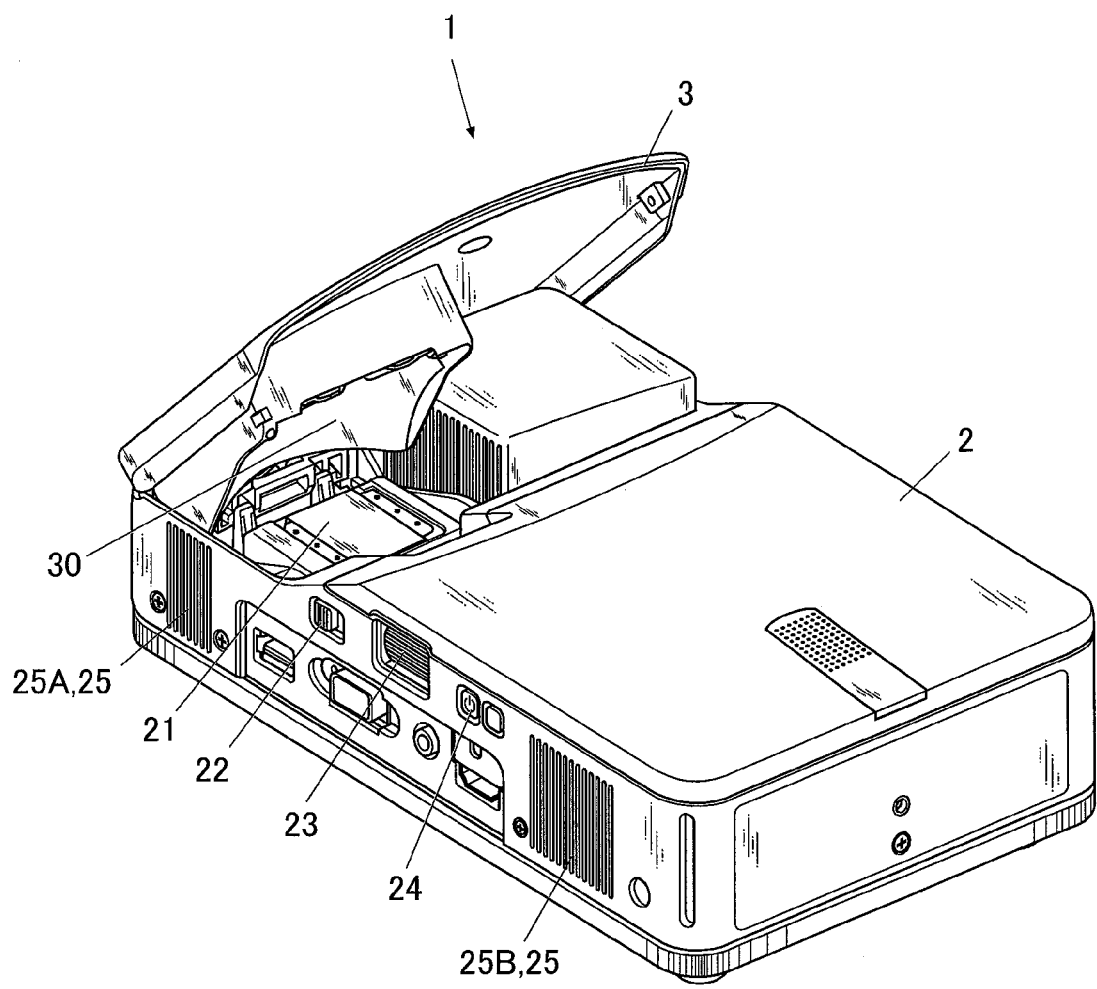
FIG. 1 is a perspective view illustrating a schematic configuration of a projection apparatus according to this embodiment.

FIG. 1 is a perspective view illustrating a schematic configuration of a projection apparatus 1. As illustrated in FIG. 1, the projection apparatus 1 is equipped with a housing 2, and a lid member 3 attached to the housing 2 so as to be freely openable/closable.

The housing 2 has an approximately cuboid shape, and houses a plurality of light sources of a red light source 31, blue light source 41 and green light source 61 (see FIG. 2) which generate video light, a display element 71 (see FIG. 2), an optical system(s), and so on. A part of an upper surface of the housing 2 is opened, and a planar surface reflecting mirror 21 and the like are disposed in the inside of the housing 2. At one side face of the housing 2, an opening/closing switch 22 for the lid member 3, a focus ring 23 for focus adjustment, and a power switch 24 are disposed. Moreover, vent holes 25 are disposed at a plurality of positions on the side faces of the housing 2.

The lid member 3 is attached to corners of the housing 2 so as to be freely rotatable. At an inner surface of the lid member 3, there is disposed a free curving surface mirror 30 reflecting the video light emitted from the optical system toward the planar surface reflecting mirror 21.

Figure 2:
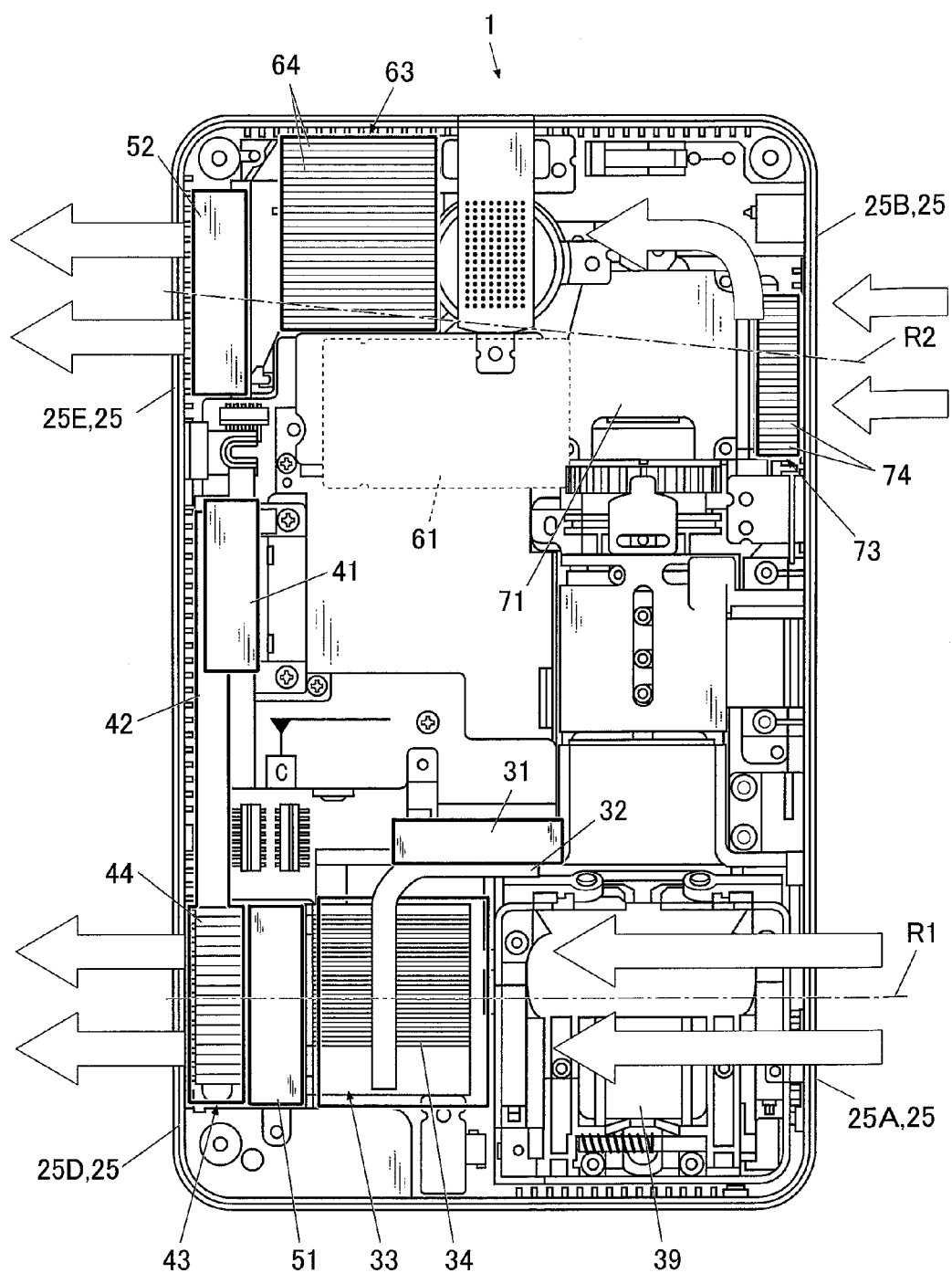
FIG. 2 is a top view illustrating an internal configuration of the projection apparatus according to the embodiment.
Figure 3:
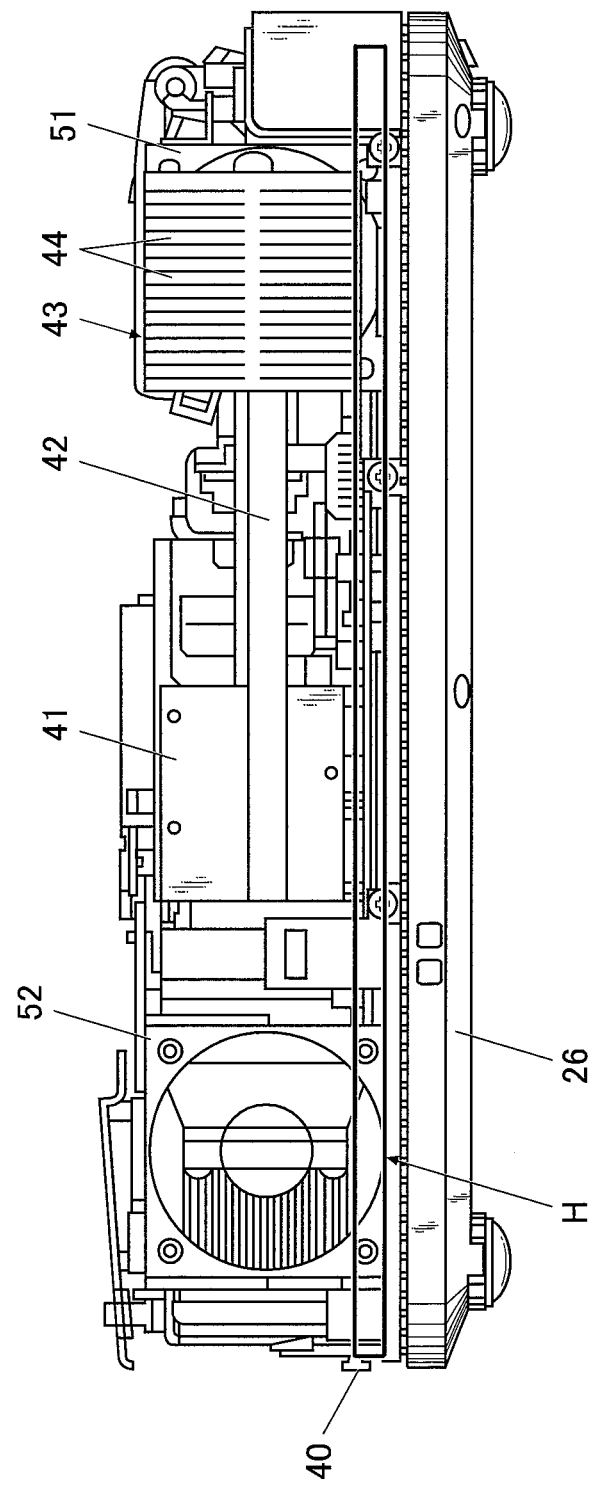
FIG. 3 is a side view illustrating the internal configuration of the projection apparatus according to the embodiment.

FIG. 2 is a top view illustrating an internal configuration of the projection apparatus 1. FIG. 3 is a side view illustrating the internal configuration of the projection apparatus 1.

In the housing 2, various kinds of electronic components and optical components are densely included. As illustrated in FIG. 3, a substrate 40 on which the various kinds of electronic components are mounted is disposed leaving a space H between the substrate 40 and a base plate 26 of the housing 2. A gas such as air flows in the space H.

As illustrated in FIG. 2, two vent holes 25 are formed in the vicinity of both ends of the one side surface of the housing 2. These two vent holes are hereinafter referred to as a first intake vent 25A and a second intake vent 25B.

In the vicinity of both ends of the other side surface of the housing 2, the other side surface facing the one side surface, two vent holes 25 are formed. These two vent holes are hereinafter referred to as a first exhaust vent 25D and a second exhaust vent 25E.

As illustrated in FIG. 2, the first intake vent 25A and the first exhaust vent 25D are disposed so that they face each other in the vicinity of one end of the housing 2. The second intake vent 25B and the second exhaust vent 25E are disposed so that they face each other in the vicinity of the other end of the housing 2.

[First Heat Radiating Structure]

First, a first heat radiating structure in the housing 2 will be described.

The red light source 31 as the first light source of the present invention and the blue light source 41 as the second light source of the present invention are disposed in the vicinity of a gas flow path R1 substantially linearly connecting the first intake vent 25A and the first exhaust vent 25D. Specifically, the red light source 31 is arranged close to the middle of the flow path R1, and the blue light source 41 is arranged near the center of the side surface in which the first exhaust vent 25D and the second exhaust vent 25E are formed.

To the red light source 31, a first heat transfer pipe 32 is connected. The first heat transfer pipe 32 is composed of, for example, a heat pipe. The first heat transfer pipe 32 is bent, and a portion beyond the bent portion of the pipe 32 is connected to a first heat radiating member 33. The first head radiating member 33 has a plurality of fins 34. The fins 34 are formed so that a linear gap between every two of them is along the flow path R1.

Heat emitted from the red light source 31 is conducted to the first hear radiating member 33 through the first heat transfer pipe 32, and released from the first hear radiating member 33.

To the blue light source 41, a second heat transfer pipe 42 is connected. The second heat transfer pipe 42 is composed of, for example, a heat pipe. The other end of the second heat transfer pipe 42 is connected to a second hear radiating member 43. The second hear radiating member 43 has a plurality of fins 44. The fins 44 are formed so that a linear gap between every two of them is along the flow path R1.

Heat emitted from the blue light source 41 is conducted to the second hear radiating member 43 through the second heat transfer pipe 42, and released from the second hear radiating member 43.

The red light source 31 has the quality of becoming darker as the temperature is raised. On the other hand, the blue light source 41 has the quality of having an approximately constant brightness regardless of the temperature. Thus, the more the red light source 31 is cooled, the more the light source power increases. Because of this, the first head radiating structure is configured so that the gas drawn from the first intake vent 25A flows on the first heat radiating member 33 before the same gas flows on the second hear radiating member 43. In other words, because an increase amount of light source power of the red light source 31 due to temperature fall is larger than that of the blue light source 41, the first hear radiating member 33 is disposed on an upstream side of the flow path R1 with respect to the second heat radiating member 43.

Moreover, because the red light source 31 has a larger amount of heat generation than that of the blue light source 41, the fins 34 of the first heat radiating member 33 are formed so as to have a larger surface area than that of the fins 44 of the second heat radiating member 43. Thus, the factor that determines the arrangement of the first heat radiating member 33 and the second heat radiating member 43 is phototransformation efficiency. Also the fact that the red light source 31 has the larger amount of heat generation than that of the blue light source 41 is the factor.

Between the first heat radiating member 33 and the second heat radiating member 43, there is disposed a first blowing member 51 which draws the gas passing through the fins 34 of the first heat radiating member 33, and sends the gas to the fins 44 of the second heat radiating member 44.

A mirror unit 39 including the planar surface reflecting mirror 21 and the like, the first heat radiating member 33, the first blowing member 51, and the second heat radiating member 43 are disposed in order from the upstream side of the flow path R1. When the first blowing member 51 is driven, the gas drawn from the first intake vent 25A passes the mirror unit 39, the fins 34 of the first heat radiating member 33, the first blowing member 51, and fins 44 of the second head radiating member 43 in this order, and is exhausted from the first exhaust vent 25D. The gas flows also in the space H below the substrate 40 when the first blowing member 51 is driven.

[Second Hear Radiating Structure]

Next, a second head radiating structure in the housing 2 will be described.

The green light source 61 and a DMD as the display element 71 are disposed in the vicinity of a gas flow path R2 substantially linearly connecting the second intake vent 25B and the second exhaust vent 25E.

To the green light source 61, a third heat radiating member 63 is connected. The third heat radiating member 63 has a plurality of fins 64. The fins 64 are formed so that a gap between every two of them is along the flow path R2.

To the display element 71, a fourth heat radiating member 73 is connected. The fourth heat radiating member 73 has a plurality of fins 74. The fins 74 are formed so that a linear gap between every two of them is along the flow path R2.

The fourth heat radiating member 73 is disposed in an immediate vicinity of the second intake vent 25B. In an immediate vicinity of the second exhaust vent 25E, there is disposed a second blowing member 52 which causes the gas to be sent to the fins 64 of the third heat radiating member 63.

The fourth heat radiating member 73, the display element 71, the green light source 61, the third heat radiating member 63, and the second blowing member 52 are disposed in order from the upstream side of the flow path R2. When the second blowing member 52 is driven, the gas drawn from the second intake vent 25B passes the fins 74 of the fourth heat radiating member 73, the display element 74, the green light source 61, the fins 64 of the third heat radiating member 63, and the second blowing member 52 in this order, and is exhausted from the second exhaust vent 25E.

The gas flows also in the space H below the substrate 40 when the second blowing member 52 is driven.

As described above, because the red light source 31 and the first heat radiating member 33 are connected to each other via the first heat transfer pipe 32 according to the embodiment, the red light source 31 and the first heat radiating member 33 can be arranged apart from each other. Similarly, because the blue light source 41 and the second heat radiating member 43 are connected to each other via the second heat transfer pipe 42, the blue light source 41 and the second heat radiating member 43 can be arranged apart from each other. When each of the red light source 31 and the blue light source 41 can be disposed apart from each of the first heat radiating member 33 and the second heat radiating member 43, the degree of freedom in the layout can be increased. Accordingly, a dead space can be more effectively utilized compared with the case that each of the red light source 31 and the blue light source 41 is configured integrally with each of the first heat radiating member 33 and the second heat radiating member 43.

Moreover, because the first heat radiating member 33 and the second heat radiating member 43 are disposed on the gas flow path R1 substantially linearly connecting the first intake vent 25A and the first exhaust vent 25D, both of the first heat radiating member 33 and the second heat radiating member 43 can be cooled with the gas flowing in the flow path R1. Thus, it is not necessary to prepare dedicated flow paths for the first heat radiating member 33 and the second heat radiating member 43, respectively, and thereby the first heat radiating structure can be compact.

Accordingly, the whole size of the projection apparatus 1 can be reduced.

Furthermore, because the first blowing member 51 interposes between the first heat radiating member 33 and the second heat radiating member 43, the first blowing member 51 drawing the gas passing through the fins 34 of the first heat radiating member 33 and sending the gas to the fins 44 of the second heat radiating member 43, both of the first heat radiating member 33 and the second heat radiating member 43 can be cooled by one blowing member 51. Therefore, the first heat radiating structure can be more compact compared with the case that dedicated blowing members are provided for the first heat radiating member 33 and the second heat radiating member 43, respectively.

Moreover, because the red light source 31 and the blue light source 41 are disposed apart from each other, they can be placed at positions where they do not influence each other, and can be cooled more efficiently.

Furthermore, the more the red light source 31 is cooled, the more the light source power increases, while the blue light source 41 has an approximately constant brightness with little effect of the temperature. For this reason, if the gas drawn from the first intake vent 25A blows against the first heat radiating member 33 before the same gas blows against the second head radiating member 43, cooling is performed more efficiently.

The red light source 31 has the larger amount of heat generation than that of the blue light source 41. Because the first heat radiating member 33 is disposed on the upstream side of the flow path R1 with respect to the second heat radiating member 43, it is possible to cool the first heat radiating member 33 with cooler gas than that used for cooling the second heat radiating member 43. Thus, cooling efficiency is further improved.

Moreover, because the red light source 31 has the larger amount of heat generation than that of the blue light source 41, and because the fins 34 of the first heat radiating member 33 has the larger surface area than that of the fins 44 of the second heat radiating member 43, an amount of heat radiation from the first heat radiating member 33 can be increased than that of the second heat radiating member 43. Thus, cooling efficiency is further improved.

Furthermore, even in the second heat radiating structure, the fourth heat radiating member 73 and the third heat radiating member 63 are disposed on the gas flow path R2 substantially linearly connecting the second intake vent 25B and the second exhaust vent 25E. Thus, the gas flowing in one flow path R2 can cool both of the fourth heat radiating member 73 and the third heat radiating member 63. Accordingly, it becomes unnecessary to provide the dedicated flow paths for the fourth heat radiating member 73 and the third heat radiating member 63, respectively, and thereby the second heat radiating structure can be compact. As a result, the whole size of the projection apparatus 1 can be reduced.

Moreover, because the second blowing member 52 is disposed on the flow path R2, the second blowing member 52 sending the gas which passes through the fins 74 and the fins 64 in order, one blowing member 52 can cool both of the fourth heat radiating member 73 and the third heat radiating member 63. Accordingly, the second heat radiating structure can be more compact compared with the case that the dedicated blowing members are provided for the fourth heat radiating member 73 and the third heat radiating member 63, respectively.

Additionally, because the gas flows in the space H below the substrate 40 when the first blowing member 51 or the second blowing member 52 is driven, the mounted components/parts on the substrate 40 can be cooled also from below the substrate 40.

The embodiments to which the present invention can be applied are not limited to the above embodiments, and may be arbitrary changed within the scope not departing from the spirit of the present invention.

Although some embodiments of the present invention are described above, the scope of the present invention is not limited to the above embodiments and includes the scope of the invention of the claims and the scope of equivalents thereof.

Although some embodiments of the present invention are described, these embodiments are mere examples, and they are not intended to limit the scope of the invention. These novel embodiments may be implemented in various other modes, and various omissions, replacements and/or modifications can be performed thereto within the scope not departing from the spirit of the present invention. These embodiments and variations thereof are included in the scope/spirit of the invention, and also in the invention described in the claims and the scope of equivalents thereof.

What is claimed is:

1. A projection apparatus comprising:
    a housing which includes an intake vent formed in one side surface of the housing, and an exhaust vent formed in the other side surface of the housing;
    a first light source;
    a first heat radiating member which includes a plurality of fins;
    a first heat transfer pipe which connects the first light source and the first heat radiating member;
    a second light source;
    a second heat radiating member which includes a plurality of fins; and
    a second heat transfer pipe which connects the second light source and the second heat radiating member,
    wherein:
    the first light source, the first heat radiating member, the first heat transfer pipe, the second light source, the second heat radiating member, and the second heat transfer pipe are housed in the housing,
    the first heat radiating member and the second heat radiating member are disposed on a gas flow path substantially linearly connecting the intake vent and the exhaust vent,
    the first light source has a larger amount of heat generation than an amount of heat generation of the second light source, and
    the first heat radiating member is disposed on an upstream side of the flow path with respect to the second heat radiating member.

2. The projection apparatus according to claim 1 further comprising:
    a blowing member which is interposed between the first heat radiating member and the second heat radiating member, and draws a gas passing through the fins of the first heat radiating member to send the gas to the fins of the second heat radiating member.

3. The projection apparatus according to claim 1, wherein the first light source and the second light source are disposed apart from each other.

4. The projection apparatus according to claim 2, wherein the first light source and the second light source are disposed apart from each other.

5. The projection apparatus according to claim 1, wherein the fins of the first heat radiating member have a larger surface area than a surface area of the fins of the second heat radiating member.

6. The projection apparatus according to claim 2, wherein the fins of the first heat radiating member have a larger surface area than a surface area of the fins of the second heat radiating member.

7. The projection apparatus according to claim 3, wherein the fins of the first heat radiating member have a larger surface area than a surface area of the fins of the second heat radiating member.

8. The projection apparatus according to claim 4, wherein the fins of the first heat radiating member have a larger surface area than a surface area of the fins of the second heat radiating member.

9. The projection apparatus according to claim 1, wherein the first light source has a larger increase amount of light source power due to temperature fall than an increase amount of light source power of the second light source due to the temperature fall.

10. The projection apparatus according to claim 2, wherein the first light source has a larger increase amount of light source power due to temperature fall than an increase amount of light source power of the second light source due to the temperature fall.

11. The projection apparatus according to claim 3, wherein the first light source has a larger increase amount of light source power due to temperature fall than an increase amount of light source power of the second light source due to the temperature fall.

12. The projection apparatus according to claim 4, wherein the first light source has a larger increase amount of light source power due to temperature fall than an increase amount of light source power of the second light source due to the temperature fall.

13. A projection apparatus comprising:
a housing which includes an intake vent formed in one side surface of the housing, and an exhaust vent formed in the other side surface of the housing;
a first light source;
a first heat radiating member which includes a plurality of fins;
a first heat transfer pipe which connects the first light source and the first heat radiating member;
a second light source;
a second heat radiating member which includes a plurality of fins; and
a second heat transfer pipe which connects the second light source and the second heat radiating member; and
a blowing member which is interposed between the first heat radiating member and the second heat radiating member, and draws a gas passing through the fins of the first heat radiating member to send the gas to the fins of the second heat radiating member,
wherein:
the first light source, the first heat radiating member, the first heat transfer pipe, the second light source, the second heat radiating member, and the second heat transfer pipe are housed in the housing,
the first heat radiating member and the second heat radiating member are disposed on a gas flow path substantially linearly connecting the intake vent and the exhaust vent,
the first light source and the second light source are disposed apart from each other,
the first light source has a larger amount of heat generation than an amount of heat generation of the second light source, and
the fins of the first heat radiating member have a larger surface area than a surface area of the fins of the second heat radiating member.

* * * * *